Patented Sept. 21, 1926.

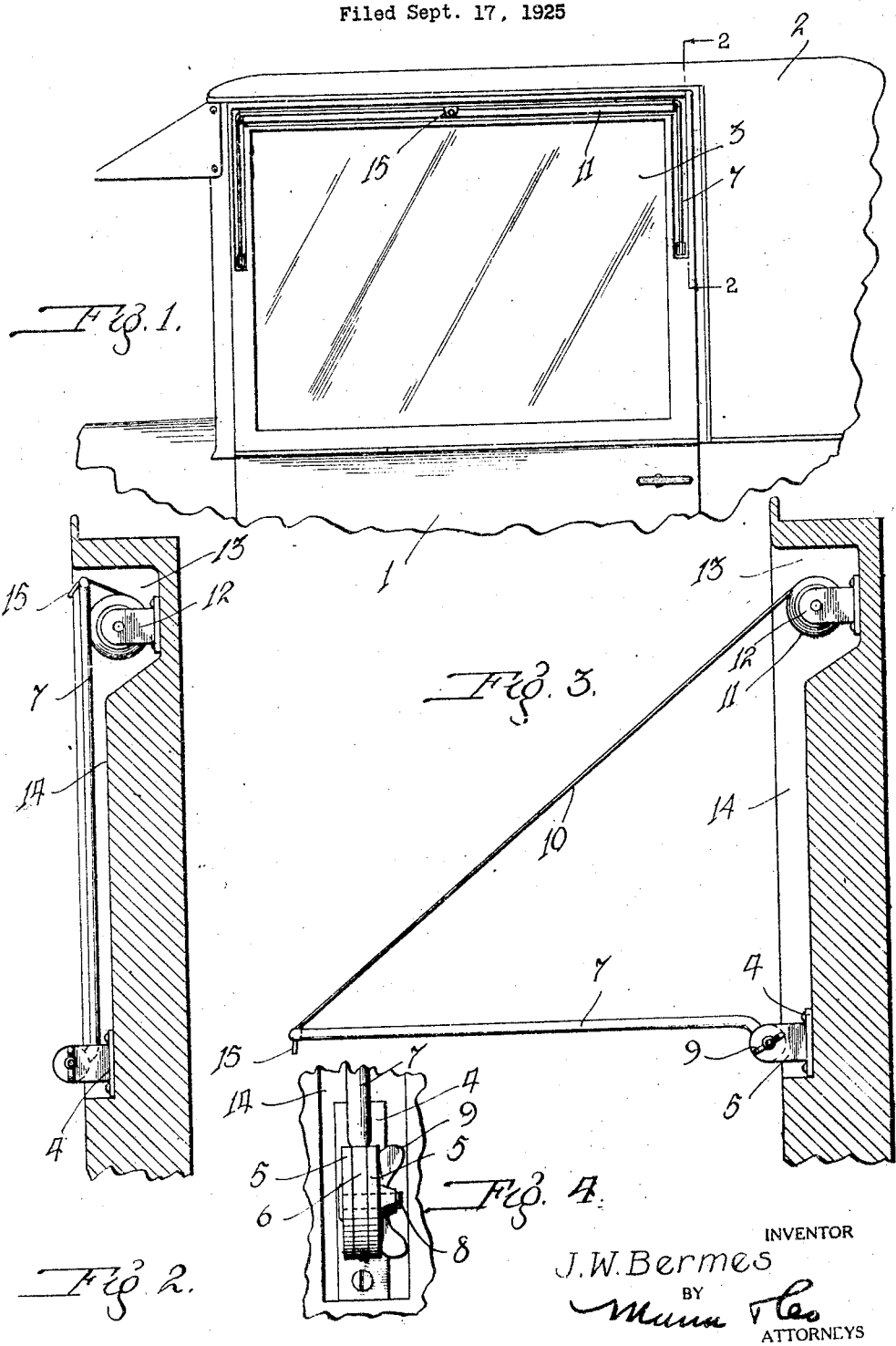

1,600,270

UNITED STATES PATENT OFFICE.

JOHN W. BERMES, OF CHICAGO, ILLINOIS.

AUTOMOBILE AWNING.

Application filed September 17, 1925. Serial No. 57,002.

My invention relates to improvements in awnings for automobiles, especially for closed cars, such as coupés or sedans and the like, and it consists in the combinations, constructions and arrangements herein described and claimed.

An object of my invention is to provide an awning which is inconspicuous when not in use, but which may be lowered instantly to any desired distance, and which when lowered will serve as a shield for the sun, or may serve as a means for preventing rain, snow or sleet from entering a window which is opened.

A further object of my invention is to provide a device of the type described, which is comparatively simple in construction, has few parts, and is not liable to easily get out of order.

Other objects and advantages will appear in the following specification, and the novel features of the invention will be particularly pointed out in the appended claims.

My invention is illustrated in the accompanying drawings, forming part of this application, in which Figure 1 is a side view of a glazed window in an automobile door, showing my improvement as applied thereto, Figure 2 is an enlarged section along the line 2—2 of Figure 1, showing the device in its closed position, Figure 3 is a view similar to Figure 2, showing the device in its opened position, and Figure 4 is a detailed view of a portion of the device.

My improved awning may be applied to cars of any type. In Figure 1, I have shown the front door 1 of a closed car 2 as having a window 3. This may be raised or lowered by any suitable mechanism (not shown).

On opposite sides of the widow 3, I provide brackets, such as those shown in Figures 2, 3 and 4. These consist of a base portion 4 having a pair of spaced-apart ears 5. Arranged to enter between the ears 5 are the circular ends 6 of a U-shaped rod 7. A pivot bolt 8 is provided with a thumb nut 9, which when tightened up, will hold the rod 7 in any position.

A curtain 10 is provided, one end of the curtain being secured to the central portion of the U-shaped rod 7, and the other end being wrapped around a spring actuated roller 11. This roller is carried by brackets 12 in a recess 13 in the frame of the bore.

In order to permit the rod 7 to fold closely to the frame so as to be as inconspicuous as possible, I provide grooves 14 in which the rods may lie when not in use.

From the foregoing description of the various parts of the device, the operation thereof may be readily understood. Normally the parts have the position shown in Figure 2. In this position it will be seen that the rod 7, as well as the roller, are partially hidden by the grooves 14 in the recess 13. When it is desired to lower the awning, all that is necessary to do is to take hold of the tape or ring 15 and pull on it outwardly. The curtain will unroll from the spring roller 11, and the awning may be lowered to the position shown in Figure 3. Here it will serve to shield the window from the sun, or to prevent rain from entering the window.

At times it may be desirable only to lower the awning for a portion of its length, as for instance, to the point indicated in dotted lines in Figure 3. The construction permits this, since by tightening the nut 9, the rod 7 and hence the curtain 10 may be held in any position desired. Thus an automobile may be left with the window partially open for ventilation, and yet the provision of the partially lowered awning will prevent rain from driving in.

When it is desired to shade the window entirely, the awning is swung outwardly and then inwardly against the side of the door, thus covering the entire window. This may be done with one motion. The rod 7 will then lie below its pivotal point and against the side of the vehicle. It will be noted that I provide a spring roller. Any ordinary form of spring roller, which will permit the rewinding of the curtain thereon when the rods are moved upwardly, will serve the purpose of the invention.

While I have indicated my preferred construction as being that in which the roller and the rods are partially concealed in the automobile door frame, it will be understood that the invention, in its broader aspects, would contemplate the device of the kind which is on the outer frame of the door or window, one in which the curtain could be pulled down partially or completly by swinging the U-shaped rod to which the curtain is attached by its pivots.

It will be noted that the nut 9 may be tightened so as to hold the rods frictionally in any position in which they may be swung, so that it is not necessary to tighten the clamp every time the awning is lowered or moved to an angular position. The frictional grip of the bearing support, however, may be adjusted by means of the nut, or the device may be actually and positively locked in any of its shifted positions, as desired.

While I have spoken of the U-shaped rod as being the preferred form of the device, it is obvious that the outer end of the curtain might be fastened to the ends of individual rods, without departing from the spirit of the invention.

It will be apparent that the use of this invention interferes in no way with the ordinary operation of the cars, such as the opening and closing of the doors and windows.

I claim:

1. The combination with the glazed door of an automobile, of a bracket secured to the door frame on each side of the glazed opening, said frame having grooves extending upwardly from said bracket, and a horizontal recess joining said grooves at their tops, a U-shaped rod having its ends pivotally mounted on said bracket, a spring-actuated roller disposed in said horizontal recess, a curtain wound on said spring-actuated roller and having one end secured to the central portion of said U-shaped rod, and frictional clamping means carried by said bracket for holding said rod in different angular positions with respect to the glazed opening.

2. The combination with an automobile body having a glazed opening, of a bracket secured to the body on each side of the glazed opening, said body having grooves extending upwardly from said bracket, a horizontal recess joining said grooves at their tops, a U-shaped rod normally disposed in said grooves and said horizontal recess, the ends of said rod being curved forwardly and being pivotally mounted on said bracket, a spring-actuated roller disposed in said horizontal recess, a curtain wound on said spring-actuated roller and having one end secured to the central portion of said U-shaped rod, and frictional clamping means carried by said bracket for holding said rod in different angular positions with respect to the glazed opening.

JOHN W. BERMES.